(12) United States Patent
Kikukawa et al.

(10) Patent No.: US 7,573,803 B2
(45) Date of Patent: Aug. 11, 2009

(54) OPTICAL RECORDING DISC

(75) Inventors: Takashi Kikukawa, Tokyo (JP);
Narutoshi Fukuzawa, Tokyo (JP);
Tatsuhiro Kobayashi, Tokyo (JP)

(73) Assignee: TDK Corporation, Tokyo (JP)

( * ) Notice: Subject to any disclaimer, the term of this patent is extended or adjusted under 35 U.S.C. 154(b) by 562 days.

(21) Appl. No.: 10/565,351

(22) PCT Filed: Jun. 30, 2004

(86) PCT No.: PCT/JP2004/009185

§ 371 (c)(1),
(2), (4) Date: Jan. 19, 2006

(87) PCT Pub. No.: WO2005/008650

PCT Pub. Date: Jan. 27, 2005

(65) Prior Publication Data

US 2006/0245338 A1    Nov. 2, 2006

(30) Foreign Application Priority Data

Jul. 22, 2003    (JP) .............................. 2003-277571

(51) Int. Cl.
*G11B 7/24* (2006.01)
(52) U.S. Cl. .................................. 369/275.1
(58) Field of Classification Search .............. 369/275.1, 369/275.2, 275.3, 275.4; 430/64, 320, 270.11, 430/270.13, 275.3, 275.4
See application file for complete search history.

(56) References Cited

U.S. PATENT DOCUMENTS 4,357,616 A    11/1982    Terao et al.
4,647,947 A    3/1987    Takeoka et al.
4,771,413 A    9/1988    Nago (Continued)

FOREIGN PATENT DOCUMENTS

EP    0474311    3/1992

(Continued)

OTHER PUBLICATIONS

Chubing Peng, "Superresolution near-filed readout in phase-change optical disk data storage", Applied Optics, vol. 40, No. 23, Aug. 10, 2001, pp. 3922-3931.

(Continued)

*Primary Examiner*—Hoa T Nguyen
*Assistant Examiner*—Andrew J Sasinowski
(74) *Attorney, Agent, or Firm*—Seed IP Law Group PLLC (57) ABSTRACT

An optical recording disc includes a substrate, a third dielectric layer, a light absorption layer, a second dielectric layer, a decomposition reaction layer containing platinum oxide as a primary component, a first dielectric layer, and a light transmission layer. The decomposition reaction layer has a thickness of 2 nm to 20 nm, and the optical recording disc is constituted so that when it is irradiated with a laser beam from the side of the light transmission layer, the platinum oxide contained in the decomposition reaction layer as a primary component is decomposed into platinum and oxygen. A bubble pit is formed in the decomposition reaction layer by thus generated oxygen gas, and fine particles of the noble metal precipitate into the bubble pit, thereby forming a recording mark in the decomposition reaction layer.

14 Claims, 3 Drawing Sheets

U.S. PATENT DOCUMENTS

| | | | |
|---|---|---|---|
| 5,252,370 A | 10/1993 | Tominaga et al. | |
| 5,297,132 A | 3/1994 | Takano et al. | |
| 5,328,813 A | 7/1994 | Strandjord et al. | |
| 5,414,451 A | 5/1995 | Sugiyama et al. | |
| 6,333,913 B1 | 12/2001 | Yoshinari et al. | |
| 6,410,115 B1 | 6/2002 | Tsai et al. | |
| 6,661,745 B1 | 12/2003 | Tominaga et al. | |
| 6,788,635 B1 | 9/2004 | Aratani et al. | |
| 6,841,218 B2 | 1/2005 | Hosoda et al. | |
| 6,896,946 B2 | 5/2005 | Chen | |
| 7,166,346 B2 | 1/2007 | Kim et al. | |
| 7,348,124 B2 | 3/2008 | Hwang et al. | |
| 2001/0021160 A1 | 9/2001 | Shuy et al. | |
| 2002/0110063 A1 | 8/2002 | Yamada et al. | |
| 2005/0219994 A1 | 10/2005 | Fukuzawa et al. | |
| 2006/0062110 A1 | 3/2006 | Kikukawa et al. | |
| 2006/0126482 A1* | 6/2006 | Kikukawa et al. | 369/275.1 |
| 2006/0153051 A1 | 7/2006 | Kikukawa et al. | |
| 2006/0161942 A1 | 7/2006 | Kikukawa et al. | |
| 2006/0165945 A1 | 7/2006 | Kobayashi et al. | |
| 2006/0188683 A1 | 8/2006 | Kikukawa et al. | |
| 2006/0245339 A1 | 11/2006 | Fukuzawa et al. | |
| 2006/0280895 A1 | 12/2006 | Kikukawa et al. | |
| 2007/0030795 A1 | 2/2007 | Kikuawa et al. | |
| 2007/0098946 A1 | 5/2007 | Kikukawa et al. | |
| 2007/0122583 A1 | 5/2007 | Shima et al. | |

FOREIGN PATENT DOCUMENTS

| | | |
|---|---|---|
| EP | 0350078 | 3/1994 |
| EP | 1028421 | 8/2000 |
| EP | 0947351 | 9/2002 |
| EP | 1640977 A1 | 3/2006 |
| EP | 1640981 A1 | 3/2006 |
| EP | 1643497 A1 | 4/2006 |
| EP | 1646042 A1 | 4/2006 |
| JP | 62016193 | 1/1987 |
| JP | 63299984 | 12/1988 |
| JP | 4298389 | 10/1992 |
| JP | 6-262854 | 9/1994 |
| JP | 6243507 A | 9/1994 |
| JP | 11227334 A | 8/1999 |
| JP | 2000-348348 A | 12/2000 |
| JP | 2004/20822 | 1/2004 |
| JP | 2004-30891 | 1/2004 |
| JP | 2004-39177 | 2/2004 |
| JP | 2004-87073 | 3/2004 |
| JP | 2004-111004 | 4/2004 |
| JP | 2004-158134 | 6/2004 |
| JP | 2004220687 A | 8/2004 |
| JP | 2005044438 A | 2/2005 |
| JP | 2000285509 | 12/2006 |
| WO | 0193256 | 12/2001 |

OTHER PUBLICATIONS

Kim Jooho et al., "Reactive recording with rare-earth transition metal", Applied Physics Letters, AIP, American Institute of Physics, Melville, NY, vol. 79, No. 16, Oct. 15, 2001, pp. 2600-2602.

Wei-Chih Hsu et al., "Blue-Laser Readout Properties of Super Resolution Near Field Structure Disc with Inorganic Write-Once Recording Layer", Japanese Journal of Applied Physics, vol. 42, No. Part 1, 2B, Feb. 2003, pp. 1005-1009.

Kim, J.H., et al., "50nm Signal Writing and Retrieve by $PtO_x$ type S-RENS Disk in Blue Laser Optical System," Extended Abstracts No. 27a-YD-4, in *Proceedings of the 63rd Meeting of Japan Society of Applied Physics*, Sep. 2002, p. 1005.

Kikukawa, T., et al., "Rigid Bubble Pit Formation and Huge Signal Enhancement in Super-resolution near-field Structure Disk with Platinum-oxide Layer," *Applied Physics Letters*, 81(25):4697-4699, Dec. 16, 2002.

Kim, J., et al., "Super-Resolution by Elliptical Bubble Formation with $PtO_x$ and AgInSbTe Layers," *Applied Physics Letters*, 83(9):1701-1703, Sep. 1, 2003.

Kim, J., et al., "Signal Characteristics of Super-RENS Disk at Blue Laser System," *Technical Digest of International Symposium on Optical Memory*, p. 264, 2003.

Kim, J., et al., "Random Pattern Signal Characteristics of Super-RENS Disk at Blue Laser System," *Technical Digest of Optical Data Storage Topical Meeting*, p. 273, 2004.

Chiu, Y., "Fabrication and nonlinear optical properties of nanoparticle silver oxide films," Journal of Applied Physics, Aug. 1, 2003, pp. 1996-2001, vol. 94, No. 3, American Institute of Physics.

Extended Abstracts (The 63rd Meeting), The Japan Society of Applied Physics, p. 1005, Sep. 2002.

Liu, W., "Near-field images of the AGOx-type super-resolution near-field structure," Applied Physics Letter, Feb. 5, 2001, pp. 685-687, vol. 78, No. 6, American Institute of Physics.

Liu, W., et al., "Nonlinear Near-Field Optical Effects of the AGOx-Type Super-Resolution Near-Field Structure," Jpn. J. Appl. Phys., Feb. 2003, p. 1031-1032, vol. 42, The Japan Society of Applied Physics.

Shima, T. et al., "Optical and Structural Property Change by the Thermal Decomposition of Amorphous Platinum Oxide Film," Jpn. J. Appl. Phys., Jun. 2003, pp. 3479-3480, vol. 42, The Japan Society of Applied Physics.

Tominaga, J., "Novel Metal Nanostructure and 4th-Generation Super-RENS Optical Disk," The European Phase Change and Ovonics Symposium, Mar. 11, 2003, pp. 1-2, Switzerland.

* cited by examiner

OPTICAL RECORDING DISC

FIELD OF THE INVENTION

The present invention relates to an optical recording disc and, particularly, to an optical recording disc which can record data constituted by a recording mark train including recording marks and blank regions neighboring recording marks therein and reproduce the data therefrom even in the case where the lengths of a recording mark and a blank region between neighboring recording marks are shorter than the resolution limit, thereby markedly increasing the storage capacity thereof and can improve the C/N ratio of the reproduced signal.

BACKGROUND OF THE INVENTION

Optical recording discs such as the CD, DVD and the like have been widely used as recording media for recording digital data and an optical recording disc that offers improved recording density and has an extremely high data transfer rate has been recently developed.

In such an optical recording disc, the storage capacity of the optical recording disc is improved by reducing a wavelength $\lambda$ of a laser beam used for recording and reproducing data and increasing a numerical aperture NA of an objective lens, thereby reducing the diameter of the laser beam spot.

DISCLOSURE OF THE INVENTION

Problems to be Solved by the Invention

In an optical recording disc, in the case where the length of a recording mark formed in the optical recording disc and the length between neighboring recording marks, namely, the length of a region (hereinafter referred to as "a blank region") where no recording mark is formed are shorter than the resolution limit, data cannot be reproduced from the optical recording disc.

The resolution limit is determined by the wavelength $\lambda$ of a laser beam and the numerical aperture NA of an objective lens for converging the laser beam and in the case where the frequency of repetition of a recording mark and a blank region, namely, the spatial frequency, is equal to or larger than $2NA/\lambda$, data recorded in the recording mark and the blank region cannot be read.

Therefore, the length of the recording mark and the blank region corresponding to the spatial frequency which can be read both become equal to or larger than $\lambda/4NA$ and in the case where an objective lens having a numerical aperture NA is used to converge a laser beam having a wavelength $\lambda$ on the surface of an optical recording disc, a recording mark having a length of $\lambda/4NA$ and a blank region having a length of $\lambda/4NA$ are the shortest recording mark and the shortest blank region which can be read.

Thus when data recorded in an optical recording disc are to be reproduced, there exists a resolution limit within which data can be read and the length of a recording mark and the length of a blank region which can be read are restricted. Therefore, if a recording mark having a length shorter than the resolution limit and a blank region having a length shorter than the resolution limit are formed in an optical recording disc, thereby recording data therein, the thus recorded data cannot be reproduced, so that the length of a recording mark and the length of a blank region which can be formed for recording data in an optical recording disc are inevitably restricted and a recording mark having a length shorter than the resolution limit and a blank region having a length shorter than the resolution limit are not normally formed in an optical recording disc to record data therein.

Therefore, in order to increase the storage capacity of an optical recording disc, it is required to shorten the wavelength $\lambda$ of the laser beam used for reproducing data or increase the numerical aperture NA of the objective lens, thereby decreasing the resolution limit so that data consisting of a recording mark having a shorter length and a blank region having a shorter length can be reproduced.

However, there is a limit to how far the wavelength $\lambda$ of the laser beam used for reproducing data can be shortened and how far the numerical aperture NA of the objective lens can be increased, so that the increase in the storage capacity of an optical recording disc that can be achieved by decreasing the resolution limit is limited.

Further, it is necessary for an optical recording disc to be constituted so that in the case of increasing the storage capacity thereof by some means or other, a reproduced signal having a high C/N ratio can be obtained when data recorded in the optical recording disc are reproduced.

It is therefore an object of the present invention to provide an optical recording disc which can record data constituted by a recording mark train including recording marks and blank regions neighboring recording marks therein and reproduce the data therefrom even in the case where the lengths of a recording mark and a blank region between neighboring recording marks are shorter than the resolution limit, thereby markedly increasing the storage capacity thereof and can improve the C/N ratio of the reproduced signal.

Means for Solving the Problems

The above object of the present invention can be accomplished by. an optical recording disc constituted so that data can be recorded therein and reproduced therefrom by converging a laser beam having a wavelength $\lambda$ of 390 nm to 420 nm thereonto using an objective lens having a numerical aperture of 0.7 to 0.9, the optical recording disc comprising a substrate, a third dielectric layer formed on the substrate and having a thickness of 10 nm to 140 nm, a light absorbing layer formed on the third dielectric layer and having a thickness of 5 nm to 100 nm, a second dielectric layer formed on the light absorbing layer and having a thickness of 5 nm to 100 nm, a decomposition reaction layer formed on the second dielectric layer, having a thickness of 2 nm to 20 nm and containing noble metal oxide as a primary component, a first dielectric layer formed on the decomposition reaction layer, and a light transmission layer formed on the first dielectric layer and having a thickness of 10 μm to 200 μm and being constituted so that when it is irradiated with the laser beam from the side of the light transmission layer, the noble metal oxide contained in the decomposition reaction layer as a primary component is decomposed into a noble metal and oxygen so that a bubble pit is formed in the decomposition reaction layer by thus generated oxygen gas and fine particles of the noble metal precipitate into the bubble pit, thereby forming a recording mark in the decomposition reaction layer.

In a study done by the inventors of the present invention, it was found that when the optical disc comprising a decomposition reaction layer containing noble metal oxide as a primary component was irradiated with a laser beam having a wavelength $\lambda$ of 390 nm to 420 nm using an objective lens having a numerical aperture of 0.7 to 0.9 from the side of the light transmission layer, the noble metal oxide contained in the decomposition reaction layer as a primary component was decomposed into a noble metal and oxygen so that a bubble pit was formed in the decomposition reaction layer by thus generated oxygen gas and fine particles of the noble metal precipitated into the bubble pit, thereby forming a recording mark in the decomposition reaction layer and recording data in the optical recording disc and that in the case where data were recorded in the optical recording disc in this manner, even if the lengths of a recording mark and a blank region between neighboring recording marks which constituted a recording mark train were shorter than the resolution limit, data could be reproduced by converging a laser beam having a wavelength λ of 390 nm to 420 nm onto the optical recording disc using an objective lens having a numerical aperture of 0.7 to 0.9 from the side of the light transmission layer.

Although it is not altogether clear why, in the case where the noble metal oxide contained in the decomposition reaction layer as a primary component is decomposed into a noble metal and oxygen, the bubble pit is formed in the decomposition reaction layer and fine particles of noble metal precipitate into the bubble pit, thereby forming a recording mark in the decomposition reaction layer and recording data in the optical recording disc, whereby it is possible to reproduce data recorded in the optical recording disc even in the case where the length of a recording mark or the length of a blank region between neighboring recording marks constituting a recording mark train is shorter than the resolution limit, it is reasonable to conclude that near-field light is generated by irradiating the fine particles of noble metal with the laser beam for reproducing data and the resolution limit disappears or that the resolution limit becomes smaller due to the interaction between the fine particles of noble metal precipitated into the bubble pit and the laser beam with which the fine particles of noble metal are irradiated.

Further, in the present invention, the decomposition reaction layer has a thickness of 2 nm to 20 nm. In a study done by the inventors of the present invention, it was found that when the thickness of the decomposition reaction layer was varied, the C/N ratio of the signal obtained by reproducing data recorded in the optical recording disc by forming a recording mark in the decomposition reaction layer varied greatly and that the C/N ratio of the signal obtained by reproducing data recorded in the optical recording disc by forming a recording mark in the decomposition reaction layer could be improved by giving the decomposition reaction layer a thickness of 2 nm to 20 nm.

Although it is not altogether clear why, in the case where the decomposition reaction layer has a thickness of 2 nm to 20 nm, the C/N ratio of the signal obtained by reproducing data recorded in the optical recording disc by forming a recording mark in the decomposition reaction layer can be improved, it is likely that when the thickness of the decomposition reaction layer is too thin the decomposition reaction layer sometimes cannot be formed as a continuous film and, on the other hand, that when the thickness of the decomposition reaction layer is too thick, the decomposition reaction layer does not readily deform and it becomes hard to form a bubble pit so as to have a desired shape as the length of a recording mark to be formed becomes shorter. Therefore, it is reasonable to conclude that in the case where the decomposition reaction layer has a thickness of 2 nm to 20 nm, the decomposition reaction layer can be readily formed and a bubble pit can be easily formed so as to have a desired shape, whereby a bubble pit having a desired shape can be formed even when the length of a recording mark to be formed in the decomposition reaction layer is short.

Thus, according to the present invention, by forming the bubble pit in the decomposition reaction layer and precipitating the fine particles of a noble metal into the bubble pit, thereby forming a recording mark in the decomposition reaction layer, data can be reproduced even if the lengths of a recording mark and a blank region between neighboring recording marks which constitute a recording mark train are shorter than the resolution limit. Therefore, it is possible to record. data in the optical recording disc, thereby markedly increasing the storage capacity of the optical recording disc. Further, since the decomposition reaction layer has a thickness of 2 nm to 20 nm, it is possible to obtain a signal having a high C/N ratio by reproducing a recording mark formed in the decomposition reaction layer even in the case where a recording mark train including recording marks and blank regions neighboring recording marks therein which are shorter than the resolution limit is formed in the decomposition reaction layer.

In the present invention, the decomposition reaction layer is formed so as to have a thickness of 2 nm to 20 nm and is preferably formed so as to have a thickness of 4 nm to 20 nm.

In the present invention, the noble metal oxide contained in the decomposition reaction layer as a primary component is not particularly limited but oxide containing at least one noble metal selected from a group consisting of Ag, Pt and Pd is preferably selected from the viewpoint of easy formation of oxide and the efficiency of generating near-field light, and platinum oxide PtOx is particularly preferable since the decomposition temperature thereof is high.

Platinum oxide PtOx has a higher decomposition temperature than those of other noble metal oxides. Therefore, when a laser beam whose power is set to that for recording data is irradiated onto the optical recording disc, thereby forming a recording mark, since it is possible to prevent heat from being diffused from the region of the decomposition. reaction layer irradiated with the laser beam to other regions of the decomposition reaction layer therearound and prevent a decomposition reaction of platinum oxide PtOx from occurring at regions other than the region irradiated with the laser beam, it is possible to form a bubble pit in the decomposition reaction layer, thereby forming a recording mark.

Further, since platinum oxide PtOx has a higher decomposition temperature than those of other noble metal oxides, even in the case where a laser beam having a high power for reproducing data is irradiated onto the optical recording disc, thereby reproducing data, there is no risk of platinum oxide PtOx decomposing into platinum and oxygen. Therefore, even in the case of repeatedly reproducing data recorded in the optical recording disc, a bubble pit can be formed without change in the shape of a recording mark and a new bubble pit is not formed at regions other than a region where the recording mark is formed. Accordingly, it is possible to improve the reproduction durability of an optical recording disc.

In the present invention, in order to obtain a reproduced signal having a high C/N ratio even in the case where the length of a recording mark or the length of a blank region between neighboring recording marks is shorter than the resolution limit, it is preferable for x in the general formula of platinum oxide: $PtO_x$ to be equal to or larger than 0.5 and equal to or smaller than 4.0 and more preferable for x to be equal to or larger than 1.0 and smaller than 3.

In the present invention, in the case where silver oxide $AgO_y$ is employed as noble metal oxide, it is preferable for y to be equal to or larger than 0.5 and equal to or smaller than 1.5 and more preferable for y to be equal to or larger than 0.5 and equal to or smaller than 1.0.

In the present invention, it is preferable for each fine particle of platinum formed by the decomposition of platinum oxide to have a particle size smaller than the bubble pit to be formed in the decomposition reaction layer. In the case where each fine particle of platinum formed by the decomposition of platinum oxide has a particle size sufficiently smaller than the bubble pit to be formed in the decomposition reaction layer, it is possible to effectively prevent the shape of the bubble pit from being affected by fine particles of platinum precipitating into the bubble pit and prevent a recording mark from being undesirably deformed.

In the present invention, the optical recording disc comprises a light absorbing layer having a thickness of 5 nm to 100 nm located below the decomposition reaction layer so as to sandwich the second dielectric layer.

In the present invention, the light absorbing layer is constituted so as to absorb a laser beam and generate heat when it is irradiated with the laser beam via the light transmission layer.

In the case where the light absorbing layer is constituted so as to absorb a laser beam and generate heat when it is irradiated with the laser beam via the light transmission layer, even if the decomposition reaction layer does not readily generate heat when it is irradiated with the laser beam, it is possible to decompose noble metal oxide contained in the decomposition reaction layer as a primary component into noble metal and oxygen by heat transferred from the light absorption layer. Therefore, even if the decomposition reaction layer is formed thin so as to be easily deformed or even if the decomposition reaction layer contains noble metal oxide having high light transmittance with respect to a laser beam, it is possible to decompose noble metal oxide in a desired manner by irradiating the decomposition reaction layer with the laser beam, thereby forming a recording mark therein.

In the present invention, the light absorption layer preferably contains a material having a high absorption coefficient with respect to a laser beam and low thermal conductivity and more preferably contains at least one of Sb and Te.

In the present invention, as an alloy contained in the light absorption layer and containing at least one of Sb and Te, an alloy represented by the general formula: $(Sb_aTe_{1-a})_{1-b}M_b$ or $\{(GeTe)_c(Sb_2Te_3)_{1-c}\}_dX_{1-d}$ is particularly preferable. Here, the element M represents an element other than Sb and Te and the element X represents an element other than Sb, Te and Ge.

In the case where the alloy which contains at least one of Sb and Te and is contained in the light absorption layer is represented by the general formula: $(Sb_aTe_{1-a})_{1-b}M$, it is preferable for a and b to be such that a is equal to or larger than 0 and equal to or smaller than 1 and that b is equal to or larger than 0 and equal to or smaller than 0.25. In the case where b is larger than 0.25, the light absorption coefficient of the light absorption layer becomes lower than the required value and the thermal conductivity thereof becomes lower than the required value.

The element M is not particularly limited but it is preferable for the element M to be at least one element selected from a group consisting of In, Ag, Au, Bi, Se, Al, Ge, P, H, Si, C, V, W, Ta, Zn, Mn, Ti, Sn, Pb, Pd, N, O and rare earth elements (Sc, Y and lanthanoid) as a primary component.

On the other hand, in the case where the alloy which contains at least one of Sb and Te and is contained in the light absorption layer is represented by the general formula: $\{(GeTe)_c(Sb_2Te_3)_{1-c}\}_dX_{1-d}$, it is preferable for c and d to be such that c is equal to or larger than ⅓ and equal to or smaller than ⅔ and d is equal to or larger than 0.9.

The element X is not particularly limited but it is preferable for the element M to be at least one element selected from a group consisting of In, Ag, Au, Bi, Se, Al, P, H, Si, C, V, W, Ta, Zn, Mn, Ti, Sn, Pb, Pd, N, O and rare earth elements as a primary component.

In the case where a laser beam having a wavelength λ of 390 nm to 420 nm is used, it is particularly preferable for the element M to contain at least one element selected from the group consisting of Ag, In, Ge and rare earth elements as a primary component and it is particularly preferable for the element X to contain at least one element selected from the group consisting of Ag, In and rare earth elements as a primary component.

In the present invention, it is preferable for the second dielectric layer and the light absorption layer to be deformed when the optical recording disc is irradiated with the laser beam, whereby the decomposition reaction layer is decomposed into noble metal and oxygen and the bubble pit is formed.

Since deformed regions of the second dielectric layer and the light absorption layer have different optical characteristics from regions where they are not deformed, it is possible to further improve the C/N ratio of the reproduced signal.

TECHNICAL ADVANTAGES OF THE INVENTION

According to the present invention, it is possible to provide an optical recording disc which can record data constituted by a recording mark train including recording marks and blank regions neighboring recording marks therein and reproduce the data therefrom even in the case where the lengths of a recording mark and a blank region between neighboring recording marks are shorter than the resolution limit, thereby markedly increasing the storage capacity thereof and can improve the C/N ratio of the reproduced signal.

EXPLANATION OF REFERENCE NUMERALS 1 optical recording disc
2 substrate
3 third dielectric layer
4 light absorbing layer
5 second dielectric layer
6 decomposition reaction layer
7 first dielectric layer
8 light transmission layer
20 laser beam

DESCRIPTION OF THE PREFERRED EMBODIMENTS

Hereinafter, preferred embodiments of the present invention will be described in detail with reference to accompanying drawings.

Figure 1:
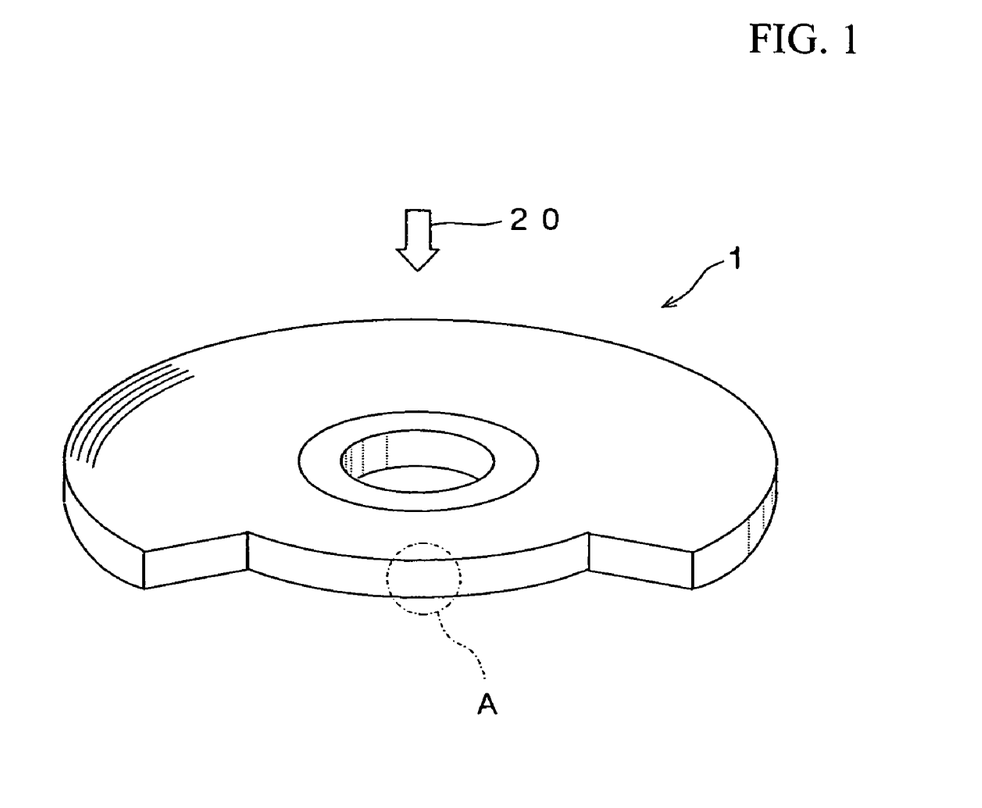
FIG. 1 is a schematic cross sectional view showing an optical recording disc that is a preferred embodiment of the present invention.
Figure 2:
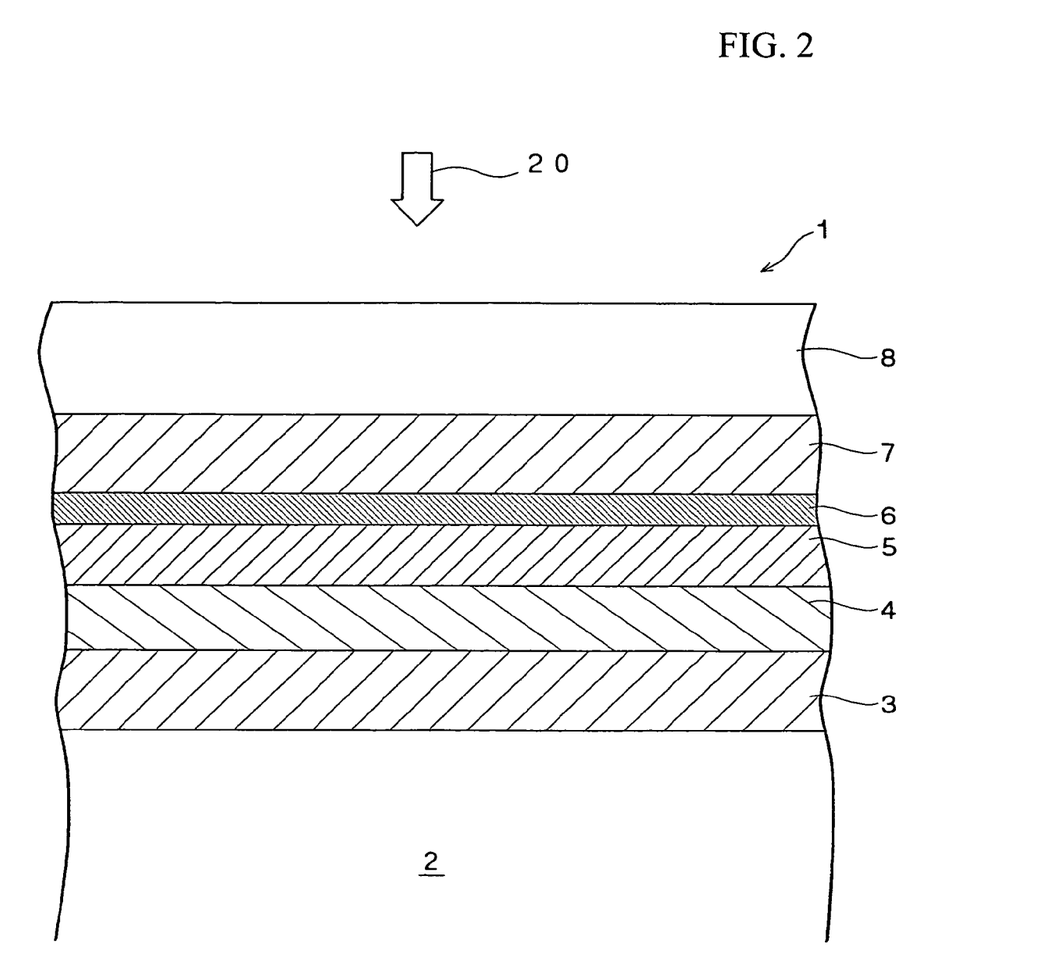
FIG. 2 is an enlarged schematic cross-sectional view of the part of the optical recording disc in FIG. 1 indicated by A.

FIG. 1 is a schematic cross sectional view showing an optical recording disc that is a preferred embodiment of the present invention and FIG. 2 is an enlarged schematic cross-sectional view of the part of the optical recording disc in FIG. 1 indicated by A within a cross section taken along the track of the optical recording disc.

As shown in FIGS. 1 and 2, an optical recording disc 1 according to this embodiment includes a substrate 2, and a third dielectric layer 3, a light absorption layer 4, a second dielectric layer 5, a decomposition reaction layer 6, a first dielectric layer 7 and a light transmission layer 8 are laminated on the substrate 2 in this order.

As shown in FIG. 1, in this embodiment, the optical recording disc 1 is constituted so that data are recorded and data recorded therein are reproduced by irradiating a laser beam 20 thereonto from the side of the light transmission layer 9. The laser beam 20 has a wavelength of 390 nm to 420 nm and is converged onto the optical recording disc 1 using an objective lens having a numerical aperture of 0.7 to 0.9.

The substrate 2 serves as a support of the optical recording disc 1 for ensuring mechanical strength required for the optical recording disc 1.

The material used to form the substrate 2 is not particularly limited insofar as the substrate 2 can serve as the support of the optical recording disc 1. The substrate 2 can be formed of glass, ceramic, resin or the like. Among these, resin is preferably used for forming the substrate 2 since resin can be easily shaped. Illustrative examples of resins suitable for forming the substrate 2 include polycarbonate resin, acrylic resin, epoxy resin, polystyrene resin, polyethylene resin, polypropylene resin, silicone resin, fluoropolymers, acrylonitrile butadiene styrene resin, urethane resin and the like. Among these, polycarbonate resin is most preferably used for forming the substrate 2 from the viewpoint of easy processing, optical characteristics and the like.

In this embodiment, the substrate 2 is formed of polycarbonate resin and has a thickness of 1.1 mm.

As shown in FIG. 2, the third dielectric layer 3 is formed on the surface of the substrate 2 of the optical recording disc 1.

In this embodiment, the third dielectric layer 3 serves to protect the substrate 2 and also physically and chemically protect the light absorption layer 4 formed thereon.

The dielectric material usable for forming the third dielectric layer 3 is not particularly limited and the third dielectric layer 3 is formed of a dielectric material containing oxide, sulfide, nitride or the combination thereof as a primary component. It is preferable to form the third dielectric layer 3 of oxide, nitride, sulfide or fluoride containing at least one element selected from a group consisting of Si, Zn, Al, Ta, Ti, Co, Zr, Pb, Ag, Sn, Ca, Ce, V, Cu, Fe and Mg, or a combination thereof.

The third dielectric layer 3 can be formed on the surface of the substrate 2 by a gas phase growth process using chemical species containing elements for forming the third dielectric layer 3. Illustrative examples of the gas phase growth processes include vacuum deposition process, sputtering process and the like.

The thickness of the third dielectric layer 3 is not particularly limited but it is preferable to form the third dielectric layer 3 so as to have a thickness of 10 nm to 140 nm.

As shown in FIG. 2, the light absorption layer 4 is formed on the surface of the third dielectric layer 3 of the optical recording disc 1.

In this embodiment, the light absorption layer 4 serves to absorb a laser beam 20 whose power is set to the recording power and which is irradiated onto the optical recording disc 1, generate heat and transfer the thus generated heat to the decomposition reaction layer 6 described later.

In this embodiment, the light absorption layer 4 is formed of an alloy containing one of Sb and Te having a high light absorption coefficient and low thermal conductivity.

As an alloy contained in the light absorption layer 3 and containing one of Sb and Te, an alloy represented by the general formula: $(Sb_aTe_{1-a})_{1-b}M_b$ or $\{(GeTe)_c(Sb_2Te_3)_{1-c}\}_dX_{1-d}$ is particularly preferable. Here, the element M represents an element other than Sb and Te and the element X represents an element other than Sb, Te and Ge.

In the case where the alloy which contains at least one of Sb and Te and is contained in the light absorption layer 4 is represented by the general formula: $(Sb_aTe_{1-a})_{1-b}M$, it is preferable for a and b to be such that a is equal to or larger than 0 and equal to or smaller than 1 and that b is equal to or larger than 0 and equal to or smaller than 0.25. In the case where b is larger than 0.25, the light absorption coefficient of the light absorption layer 4 becomes lower than the required value and the thermal conductivity thereof becomes lower than the required value required.

The element M is not particularly limited but it is preferable for the element M to be at least one element selected from a group consisting of In, Ag, Au, Bi, Se, Al, Ge, P, H, Si, C, V, W, Ta, Zn, Mn, Ti, Sn, Pb, Pd, N, O and rare earth elements (Sc, Y and lanthanoid) as a primary component.

On the other hand, in the case where the alloy contained in the light absorption layer 4 and containing at least one of Sb and Te is represented by the general formula: $\{(GeTe)_c(Sb_2Te_3)_{1-c}\}_dX_{1-d}$, it is preferable for c and d to be such that c is equal to or larger than 1/3 and equal to or smaller than 2/3 and d is equal to or larger than 0.9.

The element X is not particularly limited but it is preferable for the element M to be at least one element selected from a group consisting of In, Ag, Au, Bi, Se, Al, P, H, Si, C, V, W, Ta, Zn, Mn, Ti, Sn, Pb, Pd, N, O and rare earth elements as a primary component.

In the case where a laser beam having a wavelength $\lambda$ of 390 nm to 420 nm is used, it is particularly preferable for the element M to contain at least one element selected from the group consisting of Ag, In, Ge and rare earth elements as a primary component and it is particularly preferable for the element X to contain at least one element selected from the group consisting of Ag, In and rare earth elements as a primary component.

The light absorption layer 4 can be formed on the surface of the third dielectric layer 3 by a gas phase growth process using chemical species containing elements for forming the light absorption layer 4. Illustrative examples of the gas phase growth processes include vacuum deposition process, sputtering process and the like.

It is preferable for the light absorption layer 4 to have a thickness of 5 nm to 100 nm. In the case where the thickness of the light absorption layer 4 is smaller than 5 nm, the amount of light absorbed therein becomes too small and on the other hand, in the case where the thickness of the light absorption layer 4 is larger than 100 nm, the light absorption layer 4 does not readily deform when a bubble pit is formed in the decomposition reaction layer 6 as described later.

As shown in FIG. 2, the second dielectric layer 5 is formed on the surface of the light absorption layer 4 of the optical recording disc 1.

In this embodiment, the second dielectric layer 5 serves to physically and chemically protect the decomposition reaction layer 6 in cooperation with the first dielectric layer 7 as described later.

The dielectric material usable for forming the second dielectric layer 5 is not particularly limited and the third dielectric layer 5 is formed of a dielectric material containing oxide, sulfide, nitride, fluoride or the combination thereof as a primary component. It is preferable to form the second dielectric layer 5 of oxide, nitride, sulfide or fluoride containing at least one element selected from a group consisting of Si, Zn, Al, Ta, Ti, Co, Zr, Pb, Ag, Sn, Ca, Ce, V, Cu, Fe and Mg, or a combination thereof.

The second dielectric layer 5 can be formed on the surface of the light absorbing layer 4 by a gas phase growth process using chemical species containing elements for forming the second dielectric layer 5. Illustrative examples of the gas phase growth processes include vacuum deposition process, sputtering process and the like.

The second dielectric layer 5 is preferably formed so as to have a thickness of 5 nm to 100 nm.

As shown in FIG. 2, the decomposition reaction layer 6 is formed on the surface of the second dielectric layer 5 of the optical recording disc 1.

In this embodiment, the decomposition reaction layer 6 serves as a recording layer and a recording mark is formed in the decomposition reaction layer 6 when data are to be recorded in the optical recording disc 1.

In this embodiment, the decomposition reaction layer 7 contains platinum oxide ($PtO_x$) as a primary component.

In this embodiment, it is particularly preferable for x to be equal to or larger than 1.0 and smaller than 3.0 in order to obtain a reproduced signal having a high C/N ratio even in the case where the length of a recording mark or the length of a blank region between neighboring recording marks is shorter than the resolution limit.

The decomposition reaction layer 6 can be formed on the surface of the second dielectric layer 5 by a gas phase growth process using chemical species containing elements for forming the decomposition reaction layer 6. Illustrative examples of the gas phase growth processes include vacuum deposition process, sputtering process and the like.

The decomposition reaction layer 6 is formed so as to have a thickness of 2 nm to 20 nm and is preferably formed so as to have a thickness of 4 nm to 20 nm. However, the thickness of the decomposition reaction layer 6 is not particularly limited insofar as it falls within this range.

It is thought that in the case where the thickness of the decomposition reaction layer 6 is too thin, the decomposition reaction layer 6 sometimes cannot be formed as a continuous film, and on the other hand, that in the case where the thickness of the decomposition reaction layer 6 is too thick, the decomposition reaction layer 6 does not readily deform and it becomes difficult to form a bubble pit having a desired shape as the length of a recording mark to be formed becomes shorter. Thus, it is preferable to form the decomposition reaction layer 6 so as to have a thickness of 2 nm to 20 nm and it is more preferable to form it so as to have a thickness of 4 nm to 20 nm.

As shown in FIG. 2, the first dielectric layer 7 is formed on the surface of the decomposition reaction layer 6 of the optical recording disc 1.

In this embodiment, the first dielectric layer 7 serves to physically and chemically protect the decomposition reaction layer 6.

The material for forming the first dielectric layer 7 is not particularly limited and it is preferable to form the first dielectric layer 7 of oxide, nitride, sulfide or fluoride containing at least one element selected from a group consisting of Si, Zn, Al, Ta, Ti, Co, Zr, Pb, Ag, Sn, Ca, Ce, V, Cu, Fe and Mg, or a combination thereof.

The first dielectric layer 7 can be formed on the surface of the decomposition reaction layer 6 by a gas phase growth process using chemical species containing elements for forming the first dielectric layer 7. Illustrative examples of the gas phase growth processes include vacuum deposition process, sputtering process and the like.

As shown in FIG. 2, the light transmission layer 8 is formed on the surface of the first dielectric layer 7 of the optical recording disc 1.

The light transmission layer 8 is a layer through which the laser beam 20 is transmitted and the surface thereof forms a light incidence plane of the laser beam 20.

It is preferable for the light transmission layer 8 to have a thickness of 10 µm to 200 µm and more preferable for the light transmission layer 8 to have a thickness of 50 µm to 150 µm.

The material for forming the light transmission layer 8 is not particularly limited insofar as it is optically transparent and has a low absorption ratio and a reflectivity with respect to a laser beam having a wavelength of 390 nm to 420 nm of the wavelength of the laser beam 20, and a low birefringence factor. In the case where the light transmission layer 8 is formed using a spin coating method or the like, an ultraviolet ray curable resin, an electron beam curable resin, a thermosetting resin or the like can be used for forming the light transmission layer 8 and an activated energy ray curable type resin such as an ultraviolet ray curable resin and an electron beam curable resin is most preferably used for forming the light transmission layer 8.

The light transmission layer 8 may be formed by adhering a sheet formed of light transmittable resin onto the surface of the first dielectric layer 7 using an adhesive agent.

In the case where the light transmission layer 8 is formed using a spin coating method, the thickness thereof is preferably 10 µm to 200 µm and in the case where the light transmission layer 8 is formed by adhering a sheet formed of light transmittable resin onto the surface of the first dielectric layer 7 using an adhesive agent, the thickness thereof is preferably 50 µm to 150 µm.

Data are recorded in and reproduced from the thus constituted optical recording disc 1 as set out in the following.

Figure 3:
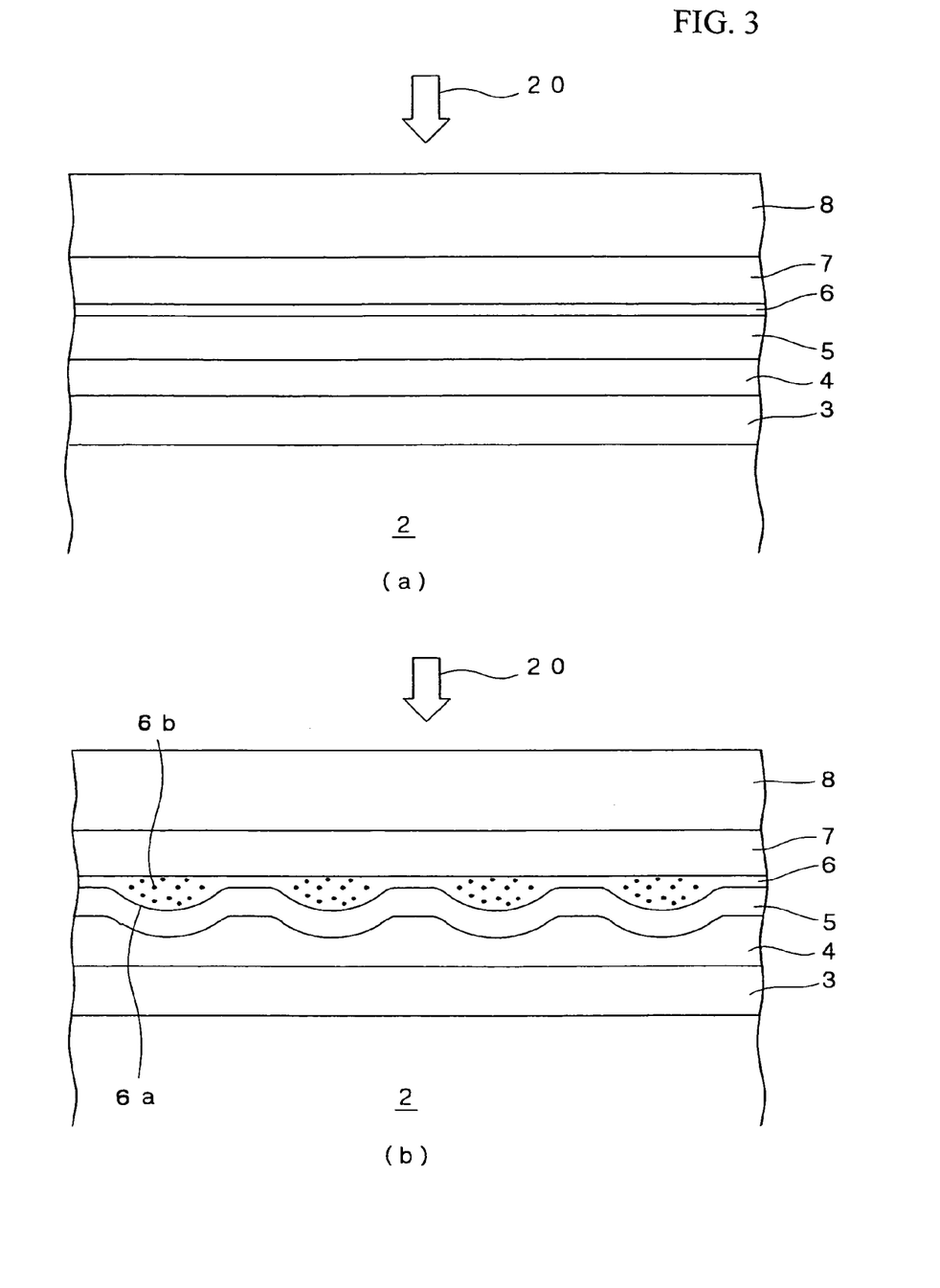
FIG. 3(a) is a partly enlarged schematic cross-sectional view of an optical recording disc before data are recorded therein and FIG. 3(b) is a partly enlarged schematic cross-sectional view of an optical recording disc after data were recorded therein.

FIG. 3(a) is a partly enlarged schematic cross-sectional view of the optical recording disc 1 before data were recorded therein and FIG. 3(b) is a partly enlarged schematic cross-sectional view of the optical recording disc 1 after data were recorded therein.

When data are to be recorded in the optical recording disc 1, the optical recording disc 1 is irradiated with a laser beam 20 from the side of the light transmission layer 8.

In this embodiment, in order to record data in the optical recording disc 1 with a high density, the laser beam 20 having a wavelength λ of 390 nm to 420 nm is converged onto the optical recording disc 1 using an objective lens having a numerical aperture NA of 0.7 to 0.85.

The power of the laser beam 20 is determined so as to be higher than 4 mW and equal to or lower than 12 mW. Here, the power of the laser beam 20 is defined as the power of the laser beam 20 on the surface of the optical recording disc 1.

When the optical recording disc 1 is irradiated with the laser beam L whose power is set to the recording power, since the light absorption layer 4 is formed of an alloy containing one of Sb and Te having a high light absorption coefficient, the region of the light absorption layer 4 irradiated with the laser beam L is heated.

Heat generated in the light absorption layer 4 is transferred to the decomposition reaction layer 6 and the temperature of the decomposition reaction layer 6 increases.

Since the platinum oxide contained in the decomposition reaction layer 6 as a primary component has high transmittance with respect to the laser beam 20, the decomposition reaction layer 6 itself does not readily generate heat even if irradiated with the laser beam 20. Therefore, it is difficult to heat the decomposition reaction layer 6, which has a thickness of 2 nm to 20 nm, to a temperature equal to or higher than the decomposition temperature of platinum oxide. However, in this embodiment, since the optical recording medium 1 includes the light absorbing layer 4 formed of the alloy containing at least one of Sb and Te each having high light absorbance, the light absorbing layer 4 generates heat and heat generated in the light absorbing layer 4 is transferred to the decomposition reaction layer 6, whereby the temperature of the decomposition reaction layer 6 increases.

Thus, when the decomposition reaction layer 6 is heated to a temperature equal to or higher than the decomposition temperature of platinum oxide, the platinum oxide contained in the decomposition reaction layer 6 as a primary component is decomposed into platinum and oxygen.

As a result, as shown in FIG. 3(b), a bubble pit 6a is formed in the decomposition reaction layer 6 by oxygen gas generated by the decomposition of the platinum oxide and fine particles 6b of platinum precipitate into the bubble pit 6a.

Simultaneously, as shown in FIG. 3(b), the decomposition reaction layer 6 is deformed together with the second dielectric layer 5 by the pressure of the oxygen gas.

Since the region where the bubble pit 6a is formed and the second dielectric layer 5 and the decomposition reaction layer 6 are deformed in this manner has different optical properties from those of other regions, a recording mark is constituted by the region where the bubble pit 6a is formed and the second dielectric layer 5 and the decomposition reaction layer 6 are deformed.

In this embodiment, thus formed recording marks and blank regions between neighboring recording marks include ones having a length shorter than $\lambda/4NA$ and a recording mark train including recording marks and blank regions having lengths shorter than the resolution limit is formed.

Further, in this embodiment, the decomposition reaction layer 6 contains platinum oxide having a high decomposition temperature as a primary component, so that when the optical recording disc 1 is irradiated with a laser beam 20 whose power is set to the recording power to form a recording mark, it is possible to prevent the decomposition reaction of platinum oxide from occurring in regions other than the region irradiated with the laser beam 20 even if heat is diffused from the region of the decomposition reaction layer 6 irradiated with the laser beam 20 to regions of the decomposition reaction layer 6 therearound. Therefore, it is possible to form the bubble pit 6a at a desired region of the decomposition reaction layer 6 to form a recording mark therein.

Furthermore, in this embodiment, when the platinum oxide is decomposed and fine particles 6b of platinum precipitate into the bubble pit 6a, thereby forming a recording mark, since the particle size of each of the fine particles 6b of platinum is smaller than the size of the bubble pit 6a formed in the decomposition reaction layer 6, it is possible to effectively prevent the shape of the bubble pit 6a from being affected by fine particles 6b of platinum precipitating into the bubble pit 6a and prevent a recording mark from being undesirably deformed.

Thus, a recording mark train is formed in the optical recording disc 1, thereby recording data therein. Data recorded in the optical recording disc 1 are reproduced in the following manner.

When data recorded in the optical recording disc 1 are to be reproduced, the laser beam 20 having a wavelength $\lambda$ of 390 nm to 420 nm is first converged onto the optical recording disc 1 using an objective lens having a numerical aperture NA of 0.7 to 0.85.

In this embodiment, the power of the laser beam 20 used for reproducing data from the optical recording disc 1 is set higher than usual and normally set to 1 mW to 4 mW.

In a study done by the inventors of the present invention, it was found that in the case where the optical recording disc 1 is irradiated with the laser beam 20 having a wavelength $\lambda$ of 390 nm to 420 nm using an objective lens having a numerical aperture NA of 0.7 to 0.85 from the side of the light transmission layer 8, data can be reproduced even when the length of a recording mark or the length of a blank region between neighboring recording marks constituting a recording mark train is shorter than the resolution limit.

Although it is not altogether clear why, in the case where the platinum oxide contained in the decomposition reaction layer 6 as a primary component is decomposed into platinum and oxygen, a bubble pit 6a is formed in the decomposition reaction layer 6 and fine particles 6b of platinum precipitate into the bubble pit 6a by the thus generated oxygen gas, thereby forming a recording mark in the decomposition reaction layer 6 and recording data in the optical recording disc 1, whereby it is possible to reproduce data recorded in the optical recording disc 1 even in the case where the length of a recording mark or the length of a blank region between neighboring recording marks constituting a recording mark train is shorter than the resolution limit, it is reasonable to conclude that near-field light is generated by irradiating the fine particles 6b of platinum precipitated into the bubble pit 6a with the laser beam 20 and the resolution limit disappears or that the resolution limit becomes smaller due to the interaction between the fine particles 6b of platinum precipitated into the bubble pit 6a and the laser beam 20 with which the fine particles 6b of platinum are irradiated.

In this embodiment, since the decomposition reaction layer 6 contains the platinum oxide whose decomposition temperature is high as a primary component, even when data are to be reproduced by irradiating the optical recording disc 1 with the laser beam 20 for reproducing data having a high power, there is no risk of platinum oxide decomposing into platinum and oxygen. Therefore, even in the case of repeatedly reproducing data recorded in the optical recording disc 1, a bubble pit 7a can be formed without change in the shape of a recording mark and a new bubble pit is not formed at regions other than the region where the recording mark is formed. Accordingly, it is possible to improve the reproduction durability of the optical recording disc 1.

Moreover, in this embodiment, the decomposition reaction layer 6 is formed so as to have a thickness of 2 nm to 20 nm. In a study done by the inventors of the present invention, it was found that when the optical recording disc 1 having the decomposition reaction layer 6 formed so as to have a thickness of 2 nm to 20 nm was irradiated with the laser beam 20, thereby forming a recording mark in the decomposition reaction layer 6 and the recording mark formed. in the decomposition reaction layer 6 was reproduced, a reproduced signal having a high C/N ratio could be obtained.

Although it is not altogether clear why, in the case where the decomposition reaction layer 6 has a thickness of 2 nm to 20 nm, the C/N ratio of the signal obtained by reproducing the recording mark formed in the decomposition reaction layer can be improved, it is likely that when the thickness of the decomposition reaction layer 6 is too thin the decomposition reaction layer 6 sometimes cannot be formed as a continuous film and, on the other hand, that when the thickness of the decomposition reaction layer 6 is too thick, the decomposition reaction layer 6 does not readily deform and it becomes hard to form a bubble pit so as to have a desired shape as the length of a recording mark to be formed becomes shorter. Therefore, it is reasonable to conclude that in the case where the decomposition reaction layer 6 has a thickness of 2 nm to 20 nm, the decomposition reaction layer 6 can be readily formed and a bubble pit can be easily formed so as to have a desired shape, whereby a bubble pit having a desired shape can be formed even when the length of a recording mark to be formed in the decomposition reaction layer 6 is short.

As described above, according to this embodiment, if a recording mark is formed in the decomposition reaction layer 6 by forming the bubble pit 6a in the decomposition reaction layer 6 and precipitating platinum fine particles 6b into the bubble pit 6a, data can be reproduced even when the lengths of a recording mark and a blank region between neighboring recording marks which constitute a recording mark train are shorter than the resolution limit. Therefore, since it is possible to record data in the optical recording disc 1 at a high density, it is possible to markedly increase the storage capacity of the optical recording disc 1. Further, since the decomposition reaction layer 6 has a thickness of 2 nm to 20 nm, it is possible to obtain a signal having a high C/N ratio by reproducing a recording mark formed in the decomposition reaction layer 6 even in the case where a recording mark train including recording marks and blank regions neighboring recording marks therein which are shorter than the resolution limit is formed in the decomposition reaction layer 6.

WORKING EXAMPLES

Hereinafter, a working example and a comparative example will be set out in order to further clarify the advantages of the present invention.

WORKING EXAMPLE

A polycarbonate substrate having a thickness of 1.1 mm and a diameter of 120 mm was set in a sputtering apparatus and a reflective layer containing Ag, Pd and Cu and having a thickness of 20 nm was formed on the surface of the polycarbonate substrate by a sputtering process.

Then, a third dielectric layer having a thickness of 100 nm was formed on the surface of the reflective layer by a sputtering process using a target of a mixture of ZnS and $SiO_2$. The mole ratio of ZnS to $SiO_2$ in the mixture of ZnS and $SiO_2$ contained in the third dielectric layer was 80:20.

Further, a light absorption layer having a thickness of 20 nm was formed on the surface of the third dielectric layer by a sputtering process using Sb and Te as a target. The composition of the light absorption layer was $Sb_{75}Te_{25}$ in terms of an atomic ratio.

Furthermore, a second dielectric layer having a thickness of 60 nm was then formed on the surface of the light absorption layer by a sputtering process using a target of a mixture of ZnS and $SiO_2$. The mole ratio of ZnS to $SiO_2$ in the mixture of ZnS and $SiO_2$ contained in the second dielectric layer was 80:20.

Then, a decomposition reaction layer containing platinum oxide (PtOx) as a primary component and having a thickness of 4 nm was formed on the surface of the second dielectric layer by a sputtering process using a mixed gas of Ar gas and oxygen gas as a sputtering gas and a Pt target. In the platinum oxide (PtOx), x was 1.5.

Further, a first dielectric layer having a thickness of 70 nm was then formed on the surface of the decomposition reaction layer by a sputtering process using a target of a mixture of ZnS and $SiO_2$. The mole ratio of ZnS to $SiO_2$ in the mixture of ZnS and $SiO_2$ contained in the first dielectric layer was 80:20.

Finally, a resin solution prepared by dissolving an acrylic ultraviolet ray curable resin in a solvent was applied onto the surface of the first dielectric layer using a spin coating method to form a coating layer and an ultraviolet ray was irradiated onto the coating layer to cure the acrylic ultraviolet ray curable resin, thereby forming a light transmission layer having a thickness of 100 µm.

Thus, an optical recording disc sample #1 formed with the decomposition reaction layer and the light absorbing layer was fabricated.

Further, an optical recording disc sample #2 was fabricated in the manner of the optical recording disc sample #1, except that a decomposition reaction layer 6 having a thickness of 20 nm and a first dielectric layer having a thickness of 40 nm were formed.

Then, an optical recording disc sample #3 was fabricated in the manner of the optical recording disc sample #1, except that a decomposition reaction layer 6 having a thickness of 30 nm and a first dielectric layer having a thickness of 50 nm were formed.

The thus fabricated optical recording disc sample #1 was set in an optical recording medium evaluation apparatus "DDU1000" (Product Name) manufactured by Pulstec Industrial Co., Ltd. and the optical recording disc sample was irradiated with a blue laser beam having a wavelength λ of 405 nm using an objective lens having an NA (numerical aperture) of 0.85 from the side of the light transmission layer, thereby forming recording marks in the decomposition reaction layer of the optical recording disc sample under the following conditions so that the lengths of the recording marks were 50 nm, 75 nm, 112.5 nm, 150 nm, 225 nm and 300 nm. At this time, no change in the phase of the light absorbing layer was observed.

Recording linear velocity: 4.9 m/sec
Recording regions: on-groove recording

After forming the recording marks, data recorded in the optical recording disc sample #1 were reproduced using the same optical recording medium evaluation apparatus under the following conditions and the C/N ratio of the reproduced signal was measured. Here, the read power of the laser beam was set to 2.6 mW and a linear reading velocity was set to 4.9 m/sec.

The results of the measurement are shown in Table 1.

Then, each of the optical recording disc samples #2 and #3 was sequentially set on the same optical recording medium evaluation apparatus and recording marks were formed in the decomposition reaction layer in the manner of the optical recording disc sample #1. Here, the recording power of the laser beam for each of the optical recording disc samples #2 and #3 was set to 5.0 mW. At this time, no change in the phase of the light absorbing layer of each sample was observed.

After forming the recording marks, data recorded in each of the optical recording disc samples #2 and #3 were reproduced using the same optical recording medium evaluation apparatus and the C/N ratio of the reproduced signal was measured. Here, the reading power of the laser beam used for reading data from the optical recording disc sample #2 was set to 2.6 mW and the reading power of the laser beam used for reading data from the optical recording disc sample #3 was set to 2.8 mW.

The results of the measurement are shown in Table 1.

TABLE 1

| LENGTH OF A RECORDING MARK (nm) | SAMPLE #1 C/N (dB) | SAMPLE #2 C/N (dB) | SAMPLE #3 C/N (dB) |
|---|---|---|---|
| 50 | 32.3 | 29.3 | 9.3 |
| 75 | 40.5 | 39.0 | 25.2 |
| 112.5 | 41.0 | 34.0 | 29.1 |

TABLE 1-continued

| LENGTH OF A RECORDING MARK (nm) | SAMPLE # 1 C/N (dB) | SAMPLE # 2 C/N (dB) | SAMPLE # 3 C/N (dB) |
|---|---|---|---|
| 150 | 48.8 | 39.2 | 28.3 |
| 225 | 54.2 | 35.8 | 33.5 |
| 300 | 53.0 | 34.9 | 37.2 |

As shown in Table 1, it was found that the C/N ratios of the reproduced signals obtained from the optical recording disc sample #1 in which the decomposition reaction layer having a thickness of 4 nm was formed and from the optical recording disc sample #2 in which the decomposition reaction layer having a thickness of 20 nm was formed where higher than the C/N ratio of the reproduced signal obtained from the optical recording disc sample #3 in which the decomposition reaction layer having a thickness of 30 nm was formed and that the C/N ratio of the reproduced signal obtained from the optical recording disc sample #1 in which the decomposition reaction layer having a thickness of 4 nm was formed was markedly improved.

On the other hand, it was found that when the length of the recording mark formed in the decomposition reaction layer exceeded 225 nm, the C/N ratio of the reproduced signal obtained from the optical recording disc sample #2 in which the decomposition reaction layer having a thickness of 20 nm was formed became lower than the C/N ratio of the reproduced signal obtained from the optical recording disc sample #3 in which the decomposition reaction layer having a thickness of 30 nm was formed. However, the C/N ratio of the reproduced signals obtained from the optical recording disc sample #2 was sufficiently high and there arose no practical problem when data were reproduced.

The present invention has thus been shown and described with reference to a specific embodiment and Working Example. However, it should be noted that the present invention is in no way limited to the details of the described arrangements but changes and modifications may be made without departing from the scope of the appended claims.

The invention claimed is:

1. An optical recording disc constituted so that data can be recorded therein and reproduced therefrom by converging a laser beam having a wavelength λ of 390 nm to 420 nm thereonto using an objective lens having a numerical aperture of 0.7 to 0.9, the optical recording disc comprising a substrate, a third dielectric layer formed on the substrate and having a thickness of 10 nm to 140 nm, a light absorbing layer formed on the third dielectric layer and having a thickness of 5 nm to 100 nm, a second dielectric layer formed on the light absorbing layer and having a thickness of 5 nm to 100 nm, a decomposition reaction layer formed on the second dielectric layer, having a thickness of 2 nm to 20 nm and containing noble metal oxide as a primary component, a first dielectric layer formed on the decomposition reaction layer, and a light transmission layer formed on the first dielectric layer and having a thickness of 10 μm to 200 μm and being constituted so that when it is irradiated with the laser beam from the side of the light transmission layer, the noble metal oxide contained in the decomposition reaction layer as a primary component is decomposed into a noble metal and oxygen so that a bubble pit is formed in the decomposition reaction layer by thus generated oxygen gas and fine particles of the noble metal precipitate into the bubble pit, thereby forming a recording mark in the decomposition reaction layer.

2. An optical recording disc in accordance with claim 1, wherein the decomposition reaction layer has a thickness of 4 nm to 20 nm.

3. An optical recording disc in accordance with claim 1, wherein the noble metal oxide is platinum oxide and the platinum oxide is decomposed into platinum and oxygen when the decomposition reaction layer is irradiated with the laser beam.

4. An optical recording disc in accordance with claim 2, wherein the noble metal oxide is platinum oxide and the platinum oxide is decomposed into platinum and oxygen when the decomposition reaction layer is irradiated with the laser beam.

5. An optical recording disc in accordance with claim 3, wherein each of the fine particles of platinum has a particle diameter smaller than a bubble pit to be formed in the decomposition reaction layer, where the particle diameter of the fine particle of platinum is defined as the diameter of a spherical fine particle of platinum.

6. An optical recording disc in accordance with claim 4, wherein each of the fine particles of platinum has a particle diameter smaller than a bubble pit to be formed in the decomposition reaction layer, where the particle diameter of the fine particle of platinum is defined as the diameter of a spherical fine particle of platinum.

7. An optical recording disc in accordance with claim 1, wherein the light absorbing layer contains at least one of Sb and Te.

8. An optical recording disc in accordance with claim 1, wherein the second dielectric layer and the light absorbing layer are deformed when the bubble pit is formed in the decomposition reaction layer.

9. An optical recording disc in accordance with claim 2, wherein the second dielectric layer and the light absorbing layer are deformed when the bubble pit is formed in the decomposition reaction layer.

10. An optical recording disc in accordance with claim 3, wherein the second dielectric layer and the light absorbing layer are deformed when the bubble pit is formed in the decomposition reaction layer.

11. An optical recording disc in accordance with claim 4, wherein the second dielectric layer and the light absorbing layer are deformed when the bubble pit is formed in the decomposition reaction layer.

12. An optical recording disc in accordance with claim 5, wherein the second dielectric layer and the light absorbing layer are deformed when the bubble pit is formed in the decomposition reaction layer.

13. An optical recording disc in accordance with claim 6, wherein the second dielectric layer and the light absorbing layer are deformed when the bubble pit is formed in the decomposition reaction layer.

14. An optical recording disc in accordance with claim 7, wherein the second dielectric layer and the light absorbing layer are deformed when the bubble pit is formed in the decomposition reaction layer.

* * * * *

UNITED STATES PATENT AND TRADEMARK OFFICE
CERTIFICATE OF CORRECTION

PATENT NO.        : 7,573,803 B2                                              Page 1 of 1
APPLICATION NO.   : 10/565351
DATED             : August 11, 2009
INVENTOR(S)       : Kikukawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 766 days.

Signed and Sealed this

Seventh Day of September, 2010

David J. Kappos
*Director of the United States Patent and Trademark Office*